(No Model.)  4 Sheets—Sheet 1.

C. G. HARSTON.
MAGAZINE GUN.

No. 415,039.  Patented Nov. 12, 1889.

Witnesses.
Robert Garrett.
Percy B. Hills.

Inventor
Charles G. Harston.
By James L. Norris.
Atty.

(No Model.) 4 Sheets—Sheet 2.
C. G. HARSTON.
MAGAZINE GUN.
No. 415,039. Patented Nov. 12, 1889.
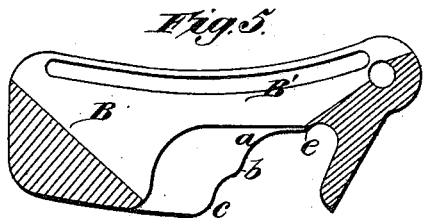
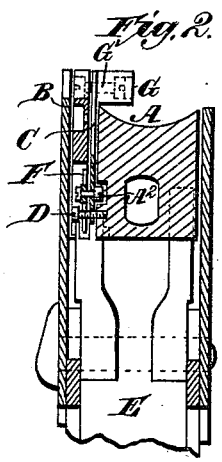
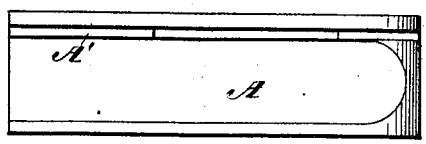
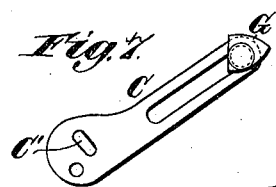
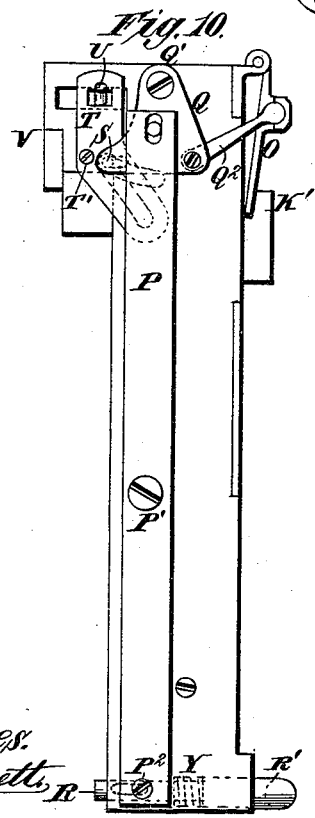
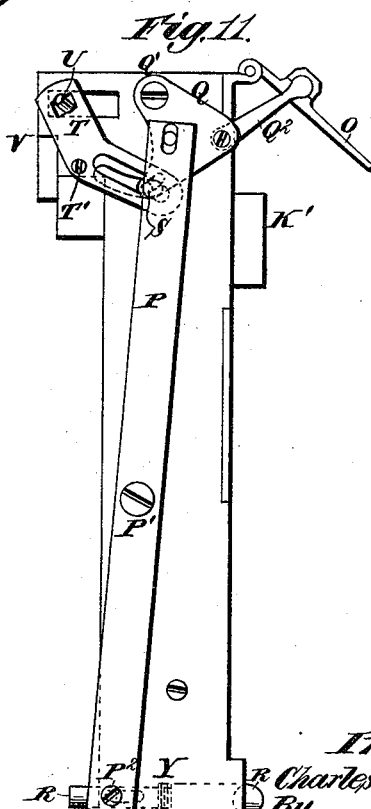
Witnesses:
Robert Everett
Percy B. Hills
Inventor:
Charles G. Harston
By James L. Norris
Atty.

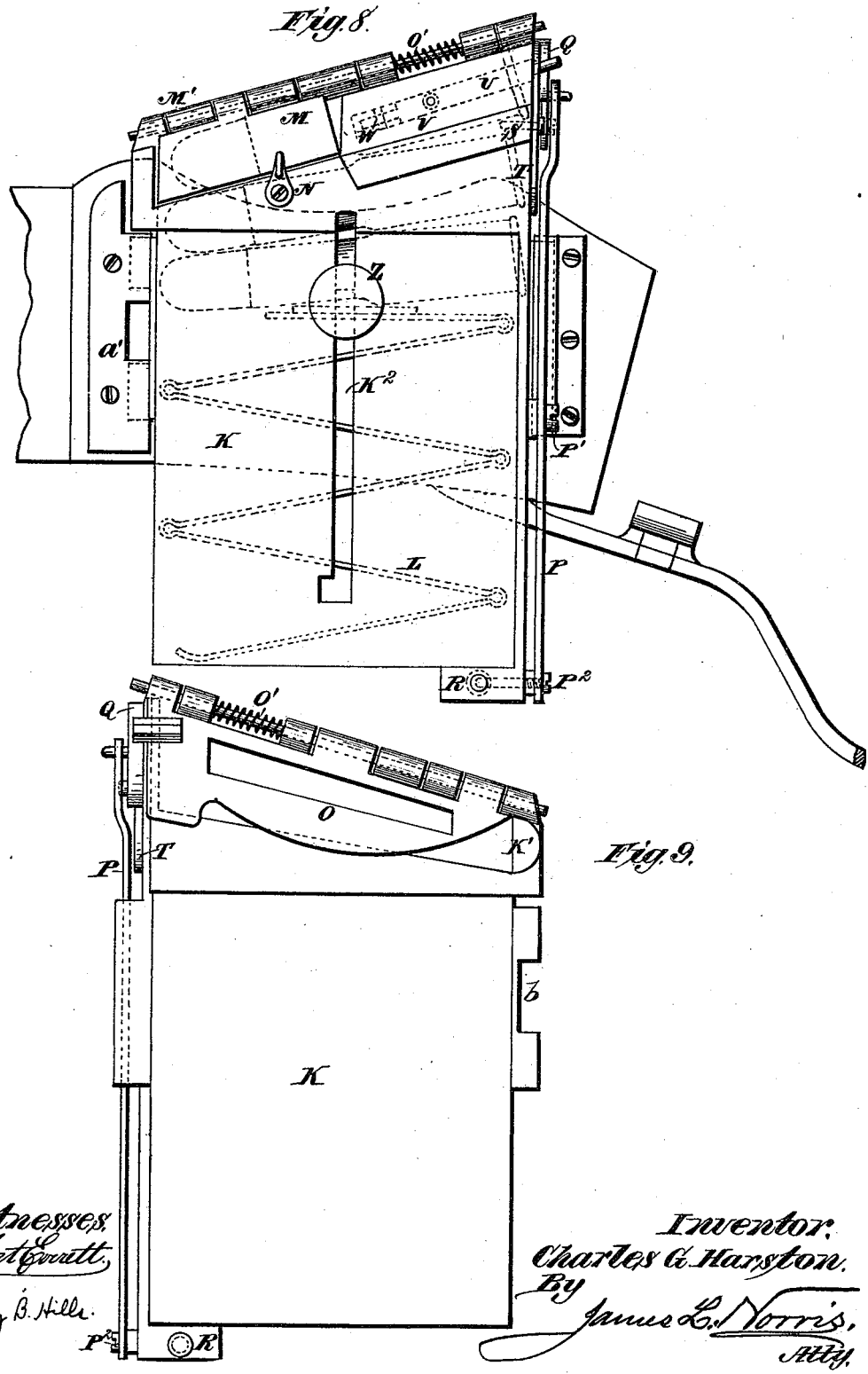

(No Model.) 4 Sheets—Sheet 4.
C. G. HARSTON.
MAGAZINE GUN.

No. 415,039. Patented Nov. 12, 1889.

Witnesses.
Robert Emmett
Percy B. Hills

Inventor:
Charles G. Harston
By James L. Norris
Atty.

UNITED STATES PATENT OFFICE.

CHARLES GREVILLE HARSTON, OF TORONTO, ONTARIO, CANADA.

MAGAZINE-GUN.

SPECIFICATION forming part of Letters Patent No. 415,039, dated November 12, 1889.

Application filed March 8, 1888. Serial No. 266,622. (No model.) Patented in England October 27, 1887, No. 14,650; in Belgium February 24, 1888, No. 80,759; in Victoria March 26, 1888, No. 5,725; in New South Wales March 28, 1888, No. 578; in Queensland April 3 and November 2, 1888, No. 503, and in India April 30 and May 17, 1888, No. 64/595.

*To all whom it may concern:*

Be it known that I, CHARLES GREVILLE HARSTON, a subject of the Queen of Great Britain, residing at 219 Beverley Street, Toronto, in the Province of Ontario, Canada, captain in the Royal Grenadiers of Canada, have invented new and useful Improvements in Fire-Arms and Cartridge-Magazines therefor, (for which I have obtained patent in Great Britain, dated October 27, 1887, No. 14,650; in Belgium, dated February 24, 1888, No. 80,759; in Victoria, dated March 26, 1888, No. 5,725; in New South Wales, dated March 28, 1888, No. 578; in Queensland, dated April 3 and November 2, 1888, No. 503, and in India, dated April 30 and May 17, 1888, No. 64/595,) of which the following is a specification.

This invention relates to breech-loading fire-arms, and has for its object to provide a novel cartridge-magazine and mechanism whereby the cartridges when fed upon the breech-block from the magazine are automatically pushed into the cartridge-chamber of the gun-barrel.

This object I accomplish in the manner and by the means hereinafter described and claimed, reference being made to the accompanying drawings, illustrating my invention, in which—

Figure 1:
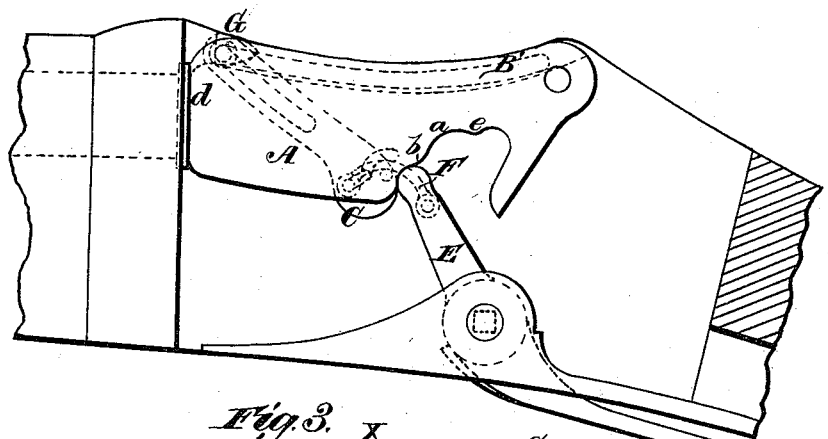
Figure 3:
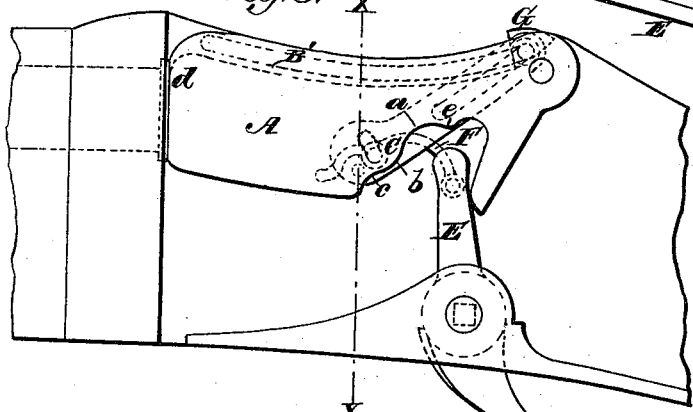
Figure 4:
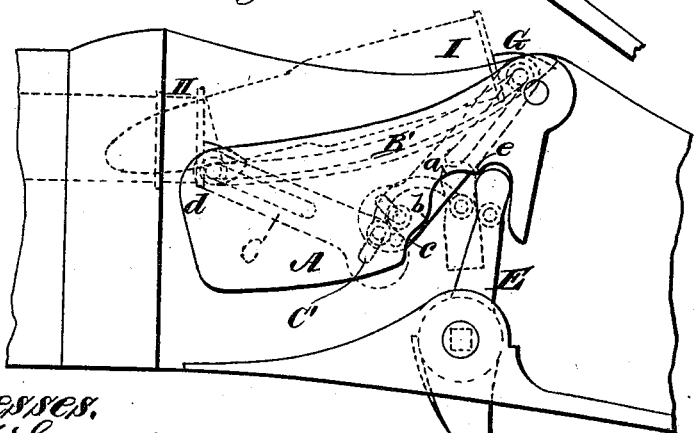
Figure 12:
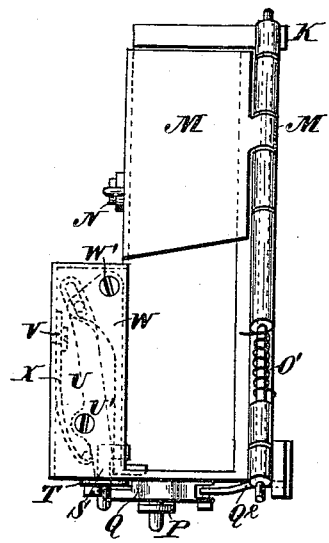
Figure 13:
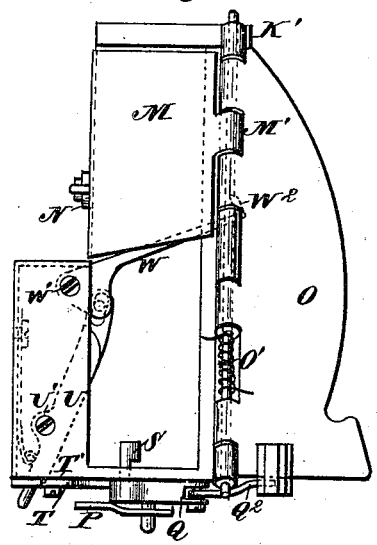
Figure 14:
Figure 15:
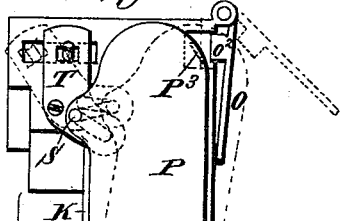
Figure 16:
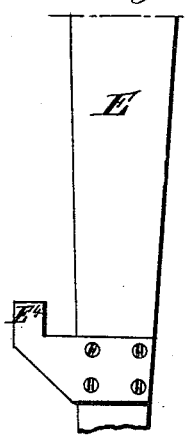
Figure 18:
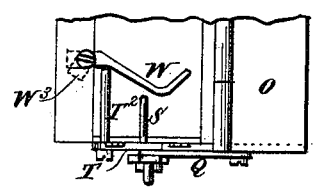
Figure 17:
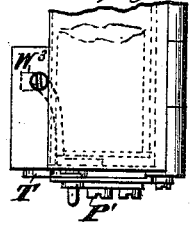

Figure 1 is a broken detail sectional view of a part of the gun, omitting the magazine. Fig. 2 is a sectional view taken on the line $x$ $x$, Fig. 3. Fig. 3 is a broken detail view showing the lever moved to place the carrier in the position opposite to that shown in Fig. 1. Fig. 4 is a similar view showing the lever moved to lower the breech-block. Fig. 5 is a detail sectional view of a part of the breech-block. Fig. 6 is a detail top plan view of the breech-block. Fig. 7 is a detail side view of the carrier-lever. Fig. 8 is an elevation looking at the outer side of the cartridge-magazine. Fig. 9 is a similar view looking at the inner side of the magazine. Figs. 10 and 11 are end elevations showing parts in different positions. Figs. 12 and 13 are top plan views of the same. Fig. 14 is a detail sectional view of the hinged latch on the main actuating-lever. Fig. 15 is a broken detail view showing a modified construction for operating the door or cover of the magazine. Fig. 16 is a broken detail view of the main actuating-lever, showing its stud for moving the door-operating lever shown in Fig. 15; and Figs. 17 and 18 are detail views showing a modified construction of cartridge-propelling lever.

In order to enable those skilled in the art to make and use my invention, I will now describe the same in detail, referring to the drawings, where—

The letter A indicates the breech-block, having a narrow slot A' formed on one side thereof, or it is narrowed or has its one side cut away to receive a plate B, which is fixed thereto in such a manner as to leave the said narrow slot A' between them. In this slot is situated the carrier-lever C, which is pivoted to the block A by a screw-pin D, the slot between A and B being of such a form as to allow the carrier-lever C to assume the two opposite positions shown on Figs. 1 and 3. The carrier-lever C is connected to the breech-block lever E by means of a curved link F, pivoted to a pin on the lever and having at its other end a pin that passes through a slot C' in the carrier C and enters a groove $A^2$ in the side of the block A. The carrier-lever C has its upper end slotted, as shown, and has attached to it the carrier-head G by means of a pin G',(shown in dotted lines,) passing through the carrier-head and through the slot of C, and also through a slot B' in the plate B, on the outer side of which it has a head, so that by means of the pin G' the carrier-head G is caused to partake of the movement of the carrier-lever C, and at the same time to follow the direction of the slot B'. This slot may either be made to follow the curvature of the hollow of the block A, as shown, or it may be made straight. In the former case the carrier-head G will consequently travel along the curved edge of the block A. The notch or recess in the block A in which the nose of the lever E works, instead of being made of the usual form, whereby the lever is caused to raise or lower the block directly after it begins to move, is enlarged considerably, as shown, so that when the block is in the raised position, as in Fig. 1, the lever E can be moved from the position there shown into the position shown in Fig. 3 without lowering the block, during which movement it will be seen that the lever will bring the carrier-lever C and carrier-head G from the forward position (shown in Fig. 1) to the backward position. (Shown in Fig. 3.) On continuing the downward motion of the lever E, this will now move the block into its lowest position, which is somewhat below that shown in Fig. 4, and during such motion the block will first be made to act on the extractor, of ordinary construction, (not shown,) so as to extract the empty case, after which the lever E will actuate the magazine, of whatever construction this may be, so as to cause this to deliver a cartridge onto the block. By a suitable spring action the lever E is then made to move back again to a slight extent, whereby it is made to bear against the shoulder $e$ in the notch of the block, and consequently to raise this into the position shown at Fig. 4. While the block remains in this position the inner end of the lever E is moved forward until it comes in contact with the part $a$ of the notch of A, by which motion it will, by means of the link F, move the carrier-lever C and carrier-head G from the backward position into the forward one, as shown at W, Fig. 4, and in doing so, as the carrier-head G bears against the end of the cartridge, it will push this from the position I into the chamber of the gun until it has assumed the position II. On the further motion of the lever E (which is rendered possible by the slot C' of the lever C) it will begin to raise the block. The front corner of this being rounded off, as shown in dotted lines at $d$, it will in rising act upon the rear end of the cartridge, so as to gradually push this home into the chamber, after which, by the time the lever has reached the point $b$ of the notch, the block will have been raised to its highest position, in which it is then held by the lever passing onto the curve $c$ of the notch in completing its movement.

It will be evident that instead of having only one carrier-lever there may be two—one on each side of the block A—and instead of the pivoted carrier-head G the lever C may act direct in the case of one on each side being used; or a single one may have a head fixed or formed thereon, in which case the slots in the lever and plate B or side of the block may be dispensed with.

The magazine consists of a rectangular casing K, in the lower end of which is a spring L for raising the cartridges, which lie one on top of the other therein, as shown in Fig. 8. The upper end or head of the casing is partly closed by a cover M, which is hinged to the casing at M' and is held closed by a catch N. On the inner side of the casing is an opening, which is closed by a flap or door O, hinged to the top of the casing, and which is opened and held closed by means to be presently described. At the one end of the casing K is a double-ended lever P, pivoted thereto at P' and connected by its upper slotted end to a plate Q, which is pivoted to the casing at Q' and connected to the door O by a link $Q^2$. Thus when the lever P is in the position shown in Figs. 10 and 12 it holds the door closed; but when it is moved into the position shown at Figs. 11 and 13 it opens the door into the position shown. The lower end of the lever P is connected by a pin $P^2$ to a slide R, working in guides on the casing K and having on its inner end an inclined face R', which, when the door O is closed and the lever P is in the position shown in Fig. 10, projects under the shoe of the gun to such an extent that when the lever E, that actuates the breech-block, passes it on its downward motion a spring-hinged latch $E^3$ (shown in section in Fig. 14) passes the slide without actuating it; but when the lever rises again the latch $E^3$ bears against the slide R, and in pushing it outward causes the lever P and door O to assume the open position shown in Fig. 11.

The plate Q carries a pin S, which projects inward through a curved slot in the end of the casing, and which, when the plate is in the position shown in Fig. 10, is situated against the side of the casing, but which, when the plate is moved by the lever P into the position shown in Figs. 11 and 13, on opening the door projects over the top of the cartridge immediately below the top one, and thus prevents this from rising while the door is open and the top cartridge is passing out. The pin S passes through a slot in a second plate T, pivoted at T' and having a hole in its upper end, through which passes the end of a lever U, situated in a box-like projection V on the outer face of the cartridge-case. This lever is pivoted at U' and has a slot at its other end, into which takes a pin on the tail of a second lever W, pivoted at W' and having a hook $W^2$ formed at its end. The lever U is acted upon by a spring X, tending to keep the levers U and W in the position shown in Fig. 12; but when lever P and plate Q are moved into the position shown in Figs. 11 and 13 for opening door O the plate Q, by means of its pin S, moves the plate T into the position there shown, thereby causing the lever U to impart a rapid motion to the lever W, so as to bring it into the position shown in Fig. 13. When in the backward position, (shown in Fig. 12,) the hook $W^2$ of the lever W is situated behind the base of the uppermost cartridge, so that when the lever P begins to open the door and to move the several other parts connected thereto the hook $W^2$ is made to press the top cartridge forward, causing its bullet end to slide outward upon the inclined surface formed at K' on the front end of the case K, so that before the door is fully open the cartridge is made to assume an oblique position in the hopper, and by the time that the door is fully opened the lever will have thrown the cartridge rapidly forward in such oblique direction.

As shown at Fig. 8, the top of the cartridge-case and the door are formed with a forward downward incline, such that the top cartridge also has a downward incline, as shown, which, together with the oblique position before mentioned, will cause it to lie in a direction exactly corresponding with the opening of the cartridge-chamber of the gun, so that when the cartridge is propelled out of the hopper, as described, it will pass directly into the cartridge-chamber, entering it to a considerable extent, so that it will only require to be pushed finally home by the carrier of the breech-block before described.

The closing movement of the hopper after the discharge of the cartridge is effected by the combined action of the spring O' on the door-hinge, the spring X, acting on the lever U, and the spring Y, acting on the slide R. By such movement the pin S is withdrawn again from above the next cartridge, which consequently now rises into the top position.

For charging the hopper when empty the spring L is depressed by the button Z, working in the slot $K^2$, and, the cover M being opened, the cartridges are introduced through the top.

Fig. 15 shows a modified construction of the lever P, whereby this is made to actuate the door O and plate T without the intervention of the plate Q and link $Q^2$. For this purpose the lever is made wider and carries near its outer edge the pin S, that retains the second cartridge, and also actuates the plate T, with its lever U, as before, and on the inner edge the lever P has a projecting stud $P^3$, which, when moved into the dotted position, acts upon a stud $O^2$ on the door O, so as to push this open. This figure also shows a different arrangement for actuating the lower end of the lever P by the lever E of the gun. The slide R is here dispensed with, and there is provided on the lower end of P a fixed incline $p$ and a pivoted incline $p'$, with spring action, so arranged that when the lever E is completing its downward motion a projecting stud $E^4$ on the lever E, (shown in plan at Fig. 16,) in coming in contact with the incline $p$, moves the end of the lever P outward to a certain extent, at the same time turning the incline $p'$ on its pivot, so that $E^4$ can pass out between them, $p'$ being then brought back against $p$. On the lever E now making a slight upward movement again, due to its spring action, the stud $E^4$ in pressing against the incline $p'$ will push the lever P back still farther, so as to complete its motion for opening the door O.

Figs. 17 and 18 show in plan a modified arrangement of the propelling-lever W and mode of actuating the same. In this case the plate T, instead of actuating a lever U, carries a pin $T^2$, which, when the door of the hopper is closed, presses against the tail $W^3$ of the propelling-lever W, and thus holds it in the backward position, as shown in Fig. 17, but which as the door opens bears against the lever W, so as to move this rapidly forward into the position shown in Fig. 18, thereby propelling the cartridge.

For securing the hopper to the side of the breech-shoe the latter may be provided with two brackets $a\ a'$ and the hopper with two tongues $b\ b'$, the bracket $a'$ and tongue $b'$ being notched, as shown, so that on first introducing $b$ into $a$, with the parts of the tongue $b'$ entering through the notches of $a'$, and then moving the hopper slightly downward, it will be secured in the brackets, as shown in Fig. 8.

It will be evident that the upper part and rear end of the hopper, which carry the above-described mechanism for opening the door and expelling the cartridge, may be made separate from the other part containing the cartridges, and may, if desired, be fixed permanently to the side of the breech-shoe, the other part being attached thereto in any convenient manner when required for use.

Having thus described the nature of my invention and the best means I know for carrying the same into practical effect, I claim—

1. The combination, in a breech-loading fire-arm, of a rising and falling breech-block, a cartridge-carrier loosely mounted on the breech-block and movable back and forth thereupon, a cartridge-magazine secured to the fire-arm and provided with an opening and closing door, a lever pivoted on the magazine, connected with said door, and having a projecting part, and the breech-block lever loosely connected with the carrier to move it back and forth and also raise and lower the breech-block, and said breech-block lever in its upward motion acting on the projecting part of the lever on the magazine to open the door on the latter, substantially as described.

2. The combination, with a breech-loading fire-arm, of a magazine secured thereto and having a hinged door O at its top, a vertical lever P, pivoted between its ends on the magazine and loosely connected with the door, a cartridge-propelling lever W, pivoted to a part of the magazine to swing and advance a cartridge, a pin S, projecting into the magazine, connections between said pin and the vertical lever to move the pin laterally when the vertical lever is swung to open the door, and a breech-block lever for swinging said vertical lever, substantially as described.

3. The combination, with a fire-arm, of a magazine secured thereto, a cartridge-propelling lever W, pivoted to the top part of the magazine, a spring-pressed lever U, pivoted to the magazine and having one end connected to the cartridge-propelling lever, a pivoted plate T, loosely engaging the other end of the spring-pressed lever, a laterally-movable pin S, projecting into the magazine and engaged by the pivoted plate, a vertical lever P, pivoted to the magazine and connected with said pivoted plate, and a breech-block lever for acting on the lower end of and swinging the vertical lever, substantially as described.

4. The combination, with a fire-arm, of a magazine secured thereto and having a hinged door O at its top, a cartridge-propelling lever W, pivoted to a top part of the magazine, a spring-pressed lever U, connected at one end with the cartridge-propelling lever, a vertical lever P, pivoted intermediate its ends to the magazine and having loose connections at its upper end with the hinged door and with the spring-pressed lever, and a breech-block lever for acting upon the lower end of the vertical lever and swinging the latter to operate the door and the cartridge-propelling lever, substantially as described.

5. The combination, in a breech-loading fire-arm, of a magazine having its top inclined downward in a forward direction and provided with a side incline K at its front to move the bullet end of the cartridge laterally to an oblique position when the cartridge is advanced, with a cartridge-propelling lever W, pivoted to the top part of the magazine, a lever U, pivoted to the magazine and pivotally connected with the cartridge-propelling lever, a vertical lever P, pivoted intermediate its ends to the magazine and having loose connections at its upper end with the spring-pressed lever, and a breech-block lever E, for acting on the lower end of the vertical lever to swing the latter, substantially as described.

6. The combination, with the rising and falling breech-block having a guideway and a breech-block lever, of a cartridge-carrier movable in the guideway of the breech-block along the length of the latter, and a link-connection between the carrier and the breech-block lever to move the carrier forward on the breech-block as the latter is lowered by the lever, substantially as described.

7. The combination, with the rising and falling breech-block having a part of its notch provided with the upper, lower, and intermediate shoulders $e\ c\ b$, of the breech-block lever E and the cartridge-carrier C, loosely pivoted to the breech-block and movable at its upper end back and forth thereupon, and a connection between the carrier and the breech-block lever for swinging said carrier, substantially as described.

In testimony whereof I have signed my name to this specification, in the presence of two subscribing witnesses, this 16th day of February, A. D. 1888.

C. GREVILLE HARSTON.

Witnesses:
OLIVER IMRAY,
*Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*